INVENTORS
ZENSUKE TAMURA
YUKIO HISHINUMA

BY *Craig & Antonelli*

ATTORNEYS

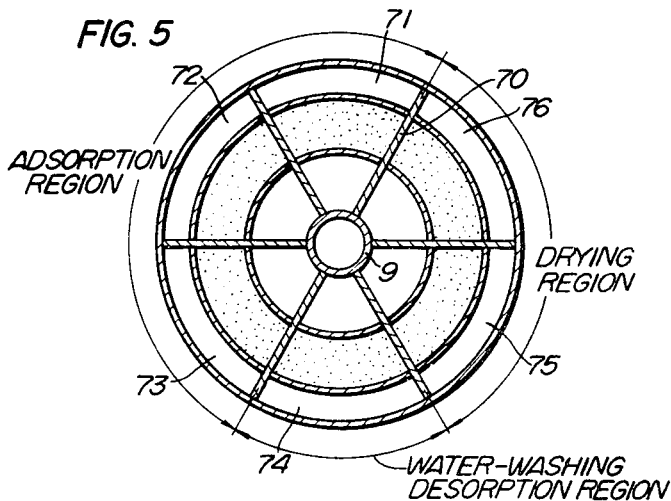
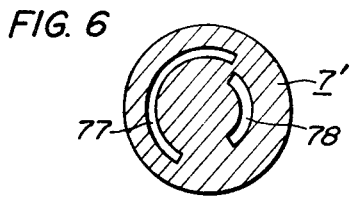
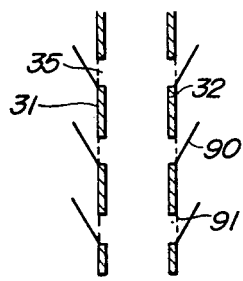 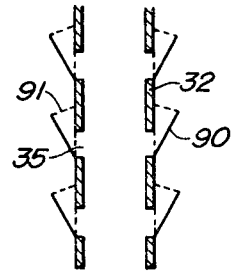

United States Patent Office 3,504,483
Patented Apr. 7, 1970

3,504,483
APPARATUS FOR THE REMOVAL OF SULFUR OXIDES FROM WASTE GASES
Zensuke Tamura and Yukio Hishinuma, Hitachi-shi, Japan, assignors to Hitachi, Ltd., Tokyo, Japan, a corporation of Japan
Filed Sept. 8, 1967, Ser. No. 666,354
Int. Cl. B01d 53/20
U.S. Cl. 55—180                                  10 Claims

ABSTRACT OF THE DISCLOSURE

An apparatus for the removal of sulfur containing acid gases from waste gases exhausted from boiler and other industrial furnaces. The device has a cylindrical body for carrying out desulfurization which is divided into equal-sized chambers so that some of the said acid gases are adsorbed by active carbon in some of said chambers and other of the said acid gases having been previously adsorbed in some other chambers are simultaneously removed from the active carbon in said other chambers by desorbing with carbon dioxide gas or water. Rotating gas passage shifting means sequentially change the passage of gases in the chambers in such a manner that the desulfurization treatment is operated continuously.

BACKGROUND OF THE INVENTION

Field of the invention

The present invention relates to an apparatus for the removal of sulfur oxides, such as sulfurous acid gas ($SO_2$) and sulfuric anhydride gas ($SO_3$) from waste gases exhausted from furnaces for gas turbine and boiler or from other industrial furnaces.

Description of the prior art

Sulfur oxides contained in waste gases being released into the atmosphere from industrial furnaces are the sources of air pollution and even a small amount of them present in the atmosphere will be hazardous for the human body. It is, therefore, necessary to prevent such sulfuric oxides from being dispersed into the atmosphere. For this purpose, there must be provided an apparatus which is not only capable of removing such sulfur oxides from industrial waste gases but also practical and economical for industrial applications. Furthermore, the apparatus is required to be capable of continuous operation with a lasting ability of desulfurization, in the light of the fact that a gas turbine or steam boiler with which it is to be used is operating continuously.

In order to remove sulfur oxides from waste gases, there has been proposed an apparatus in which an adsorption column and a desorption column, provided separately, are communicated with each other and an adsorbent, such as active carbon or pitch coke particles, is circulated through said columns continuously, whereby the adsorbent having adsorbed sulfur oxides in the adsorption column during passage therethrough is regenerated in the desorption column and recirculated into the adsorption column for reuse. However, to achieve the continuous removal of sulfur oxides from waste gases with the apparatus described, the adsorbent must be circulated continuously. This means that the apparatus must be provided with a power and a device to effect the circulation of adsorbent, with the consequence that the entire apparatus is rendered costly and large in size. In addition, when active carbon is used as an adsorbent, the active carbon is subjected to breakage during continuous circulation and thus the service life thereof is rendered short.

SUMMARY OF THE INVENTION

It is, therefore, an object of the present invention to provide an apparatus for the removal of sulfur oxides from waste gases, in which a sulfur oxide adsorption region and a desorption region are formed in a single column, so as to make the apparatus compact in form as well as to reduce the cost of the apparatus.

It is another object of the present invention to provide an apparatus of the type described, which is capable of desulfurizing waste gases continuously without moving an adsorbent used.

It is still another object of the present invention to provide an apparatus of the type described, in which water is used for removing sulfur oxides from the adsorbent and the waste gases from a steam turbine or steam boiler is used for drying the wet adsorbent.

BRIEF DESCRIPTION OF THE DRAWINGS

FIG. 5 is a transverse cross section taken on the line V—V of FIG. 4;

FIG. 6 is a transverse cross section taken on the line III—III of FIG. 4; and

FIGURES 7a and 7b are a set of enlarged views showing a portion of FIG. 4.

DESCRIPTION OF THE PREFERRED EMBODIMENTS

Figure 1:
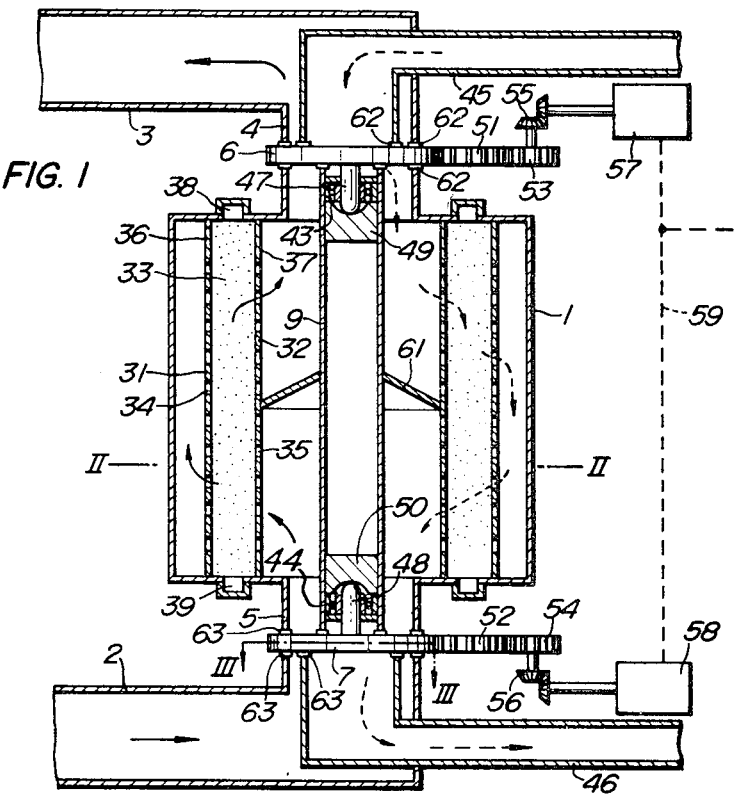
FIG. 1 is a schematic view of an embodiment of the apparatus according to the present invention.
Figure 2:
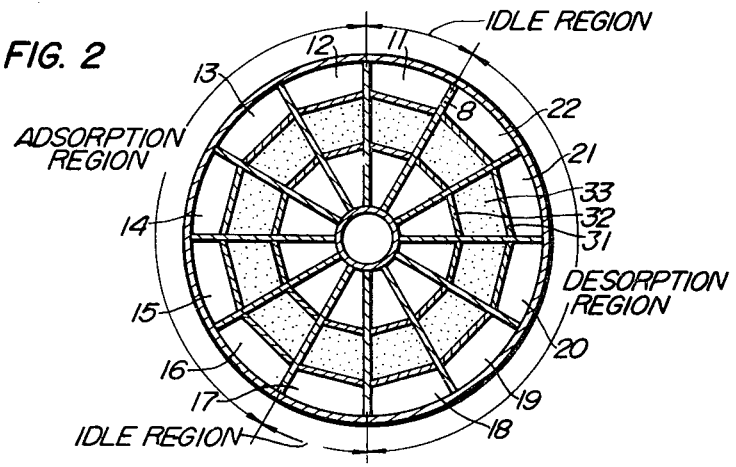
FIG. 2 is a transverse cross section taken on the line II—II of FIG. 1.

Referring to the drawings and first to FIGS. 1 and 2, a cylindrical body 1 has a gas inlet tube 2 connected to the bottom end and a gas outlet tube 3 connected to the top end thereof. At the neck portions 5 and 4 of the gas inlet tube 2 and the gas outlet tube 3 are provided gas passage shifting members or means for switching-over gases 7 and 6 respectively. Interior of the body 1 is equally divided into 12 sections by means of partition walls 8 as shown in FIG. 2 and each of the partition walls 8 is welded at both edges to the interior wall of the body 1 and the exterior wall of a hollow cylindrical member 9 extending axially of the body 1, so that said hollow cylindrical member 9 is supported by the body 1 by way of the partition walls 8.

As stated, the interior of the body 1 is divided into 12 sections consisting of chambers 11, 12, 13, 14, 15, 16, 17, 18, 19, 20, 21 and 22 and each chamber is further divided into three sub-chambers by steel strip members 31 and 32. The intermediate sub-chamber 33 (hereinafter referred to as an adsorbent bed zone) is filled with an adsorbent such, for example, as active carbon. The steel strips 31 and 32 are respectively coated with a corrosion-resistant material or corrosion-resistance paint and have a number of small apertures 34 and 35 perforated therein. Such apertures, however, are not formed in the upper portions 36 and 37 of the respective steel strips 31 and 32, for the purpose of preventing the passage of waste gases from the adsorbent bed zone to the adjacent sub-chambers in each chamber, without passing through said adsorbent bed zone, which would otherwise occur when an air space is formed at the upper portion of said adsorbent bed zone as a result of reduction in volume of the active carbon therein due to breaking down of the same upon consumption..

The cylindrical body 1 is provided on the upper surface thereof with a plurality of active carbon inlets 38, each communicating with one of the absorbent bed zones. The cylindrical body is also provided on the bottom surface thereof with a plurality of active carbon outlets 39, each communicating with one of the absorbent bed zones. The inlets 38 and the outlets 39 are closed during normal operation of the apparatus.

Figure 3:
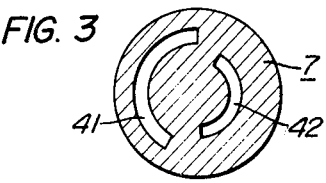
FIG. 3 is a transverse cross section taken on the line III—III of FIG. 1.

The gas passage shifting members 6 and 7, as shown in FIG. 3, are each provided with an arcuate slot 41 for the passage of waste gases and an arcute slot 42 for the passage of desorption gas therethrough into the interior of the body 1, said arcuate slot 41 having a central angle of about 150° and said arcuate slot 42 similarly having a central angle of about 150°. The confronting ends of these arcuate slots 41 and 42 are spaced apart from each other circumferentially by a central angle of about 30°.

Both of the gas passage shifting members 6 and 7 have the same configuration and are arranged in the same position with respect to the positions of the slots formed therein. As a desorbing gas, carbon dioxide gas ($CO_2$) or nitrogen gas (N) is used. An inlet tube 45 and an outlet tube 46 for the desorbing gas have one end thereof connected to the exterior walls of the gas passage shifting members 6 and 7 respectively for communication with the slots 42 in the respective shifting members. The shifting members 6 and 7 respectively have support pins 47 and 48 fixedly mounted to the interior wall thereof, which support pins are journaled in bearings 43 and 44 provided on respective support blocks 49 and 50 at both ends of the hollow cylindrical member 9. Thus, it will be understood that the shifting members 6 and 7 are supported by the hollow cylindrical member 9.

The shifting members 6 and 7 are each provided along the periphery thereof with external gears for engagement with respective gears 51 and 52. The gears 51 and 52 are respectively in engagement with gears 53 and 54 which are operatively connected to electric motors 57 and 58 through sets of bevel gears 55 and 56 respectively. It will, therefore, be seen that the shifting members 6 and 7 are operated by the respective electric motors 57 and 58. The electric motors 57 and 58 are electrically connected with each other by an electric wire 59 for cooperation.

Between the hollow cylindrical member 9 and each strip member 32 is provided a sloped barrier plate 61 so as to cause the waste gases and desulfurized gases to flow zigzag as indicated by the arrows.

In operating the apparatus of the construction described above, when the gas passage shifting members 6 and 7 are in the positions as shown in FIG. 3, the waste gas inlet tube 2 is in communication with the chambers 12, 13, 14, 15 and 16, so that the waste gases are introduced into said chambers through the slot 41. These five chambers, in this case, serve as adsorption chambers constituting an adsorption region as shown in FIG. 2.

Sulfurous acid gas is adsorbed by active carbon at high efficiency when waste gases are introduced into the active carbon-adsorbent bed zone after cooling them to about 100° C. On the other hand, sulfuric anhydride gas is adsorbed at high efficiency when the waste gases are introduced into the active carbon-adsorbent bed zone after cooling them to about 200° C. Therefore, by lowering the temperature of waste gases in accordance with the character of a particular sulfur oxide to be removed, it is possible to adsorb said sulfur oxide in an efficient manner.

In the position of the gas passage shifting member 6 shown in FIG. 3, a desorbing gas inlet tube 45 is in communication with the chambers 18, 19, 20, 21 and 22, so that the desorbing gas is introduced into said chambers through the slot 42. These five chambers, in this case, serve as desorption chambers constituting a desorption region as indicated in FIG. 2. The desorption gas consists of carbon dioxide gas or nitrogen gas which is heated to about 400° C. By the use of such desorption gas, the sulfur oxides having been adsorbed by the active carbon can be desorbed into said desorption gas.

The chambers 17 and 11 located between the adsorption region and desorption region constitute idle chambers into which no waste gases nor desorbing gas are introduced.

The chambers constituting the adsorption region are in communication with the waste gas outlet tube 3, through which the waste gases having the sulfur oxides removed therefrom are discharged via the slot 41. On the other hand, the chambers constituting the desorption region is in communication with the desorbing gas outlet tube 46, through which the desorbing gas carrying the desorbed sulfur oxides is discharged via the slot 42.

The electric motors 57 and 58 are held inoperative during the process of adsorption and desorption. When the adsorption and desorption operation has been carried out for a prescribed period, the electric motors are set in operation to revolve the respective gas passage shifting members through an angle of 30°. Upon revolution of the shifting members, the chamber 11 is shifted to constitute the adsorption region, the chamber 17 to constitute the desorption region and the chambers 16 and 22 to constitute the idle region. In the manner described, each chamber is shifted to constitute the adsorption region, desorption region and idle region one after another in sequence as the shifting members 6 and 7 are revolved.

At the portions where the shifting members 6 and 7 are in contact with the respective tubes are provided sealing members 62 and 63 to prevent the gases from leaking therethrough.

Figure 4:
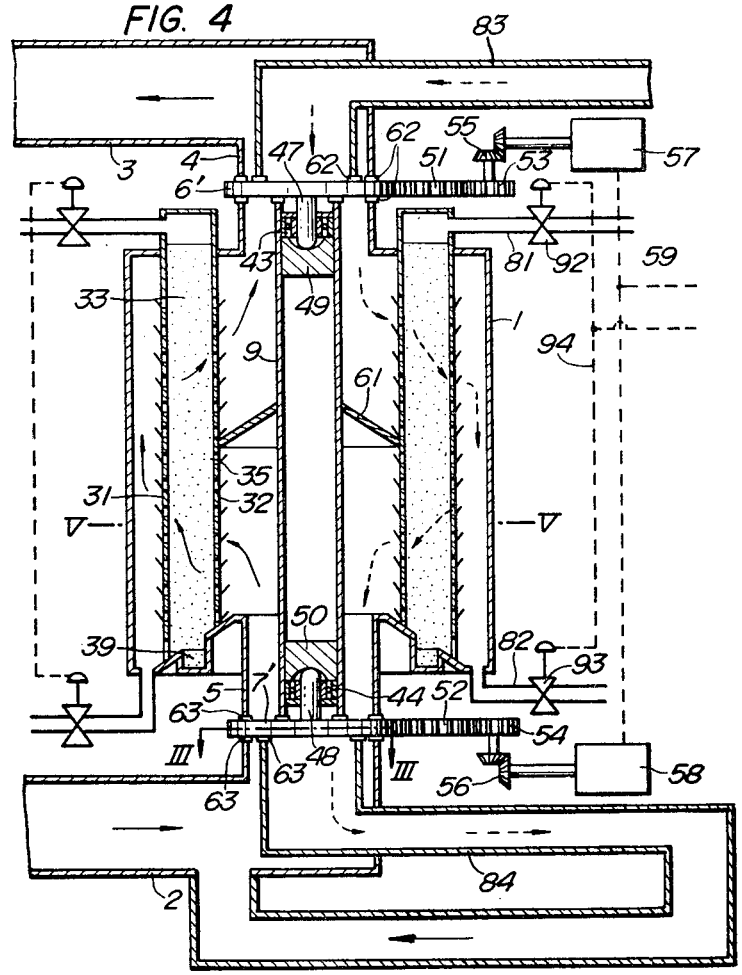
FIG. 4 is a schematic view of another embodiment of the apparatus according to the present invention.

According to another embodiment of the apparatus of this invention, shown in FIGS. 4 and 5, the interior of the cylindrical body 1 is equally divided into six sections, consisting of chambers 71, 72, 73, 74, 75 and 76, by partition walls 70. The gas passage shifting members 6' and 7', as shown in FIG. 6, are each provided with an arcuate slot 77 for the passage of waste gases, which has a central angle of about 180°, and an arcuate slot 78 for the passage of a drying gas, which has a central angle of about 120°, in such a manner that one end of the respective slots are spaced apart from each other circumferentially by a central angle of about 60°. The slots formed in the manner described enable the chambers 71, 72 and 73 to constitute an adsorption region and chambers 75 and 76 to constitute a drying region, as shown in FIG. 5. The chamber 74 constitutes a water-washing and desorption region into which water is circulated. The adsorbent bed zone 33 of each chamber, filled with active carbon, is in communication with a water feed tube 81 above the top wall of the body 1. The water introduced into the adsorbent bed zone 33 flows downwardly through the stack of active carbon while washing off the sulfur oxides having been adsorbed by said active carbon therefrom, and is discharged through a drain tube 82 connected to the bottom end of each chamber.

The chambers in the drying region are each in communication with a drying gas inlet tube 83 and a drying gas outlet tube 84. A drying gas introduced into the chambers in the drying region through the slot 78 in the gas passage shifting member 6' flows through said respective chambers while drying the wet active carbon, and is discharged through the drying gas outlet tube 84 via the slot 78 in the shifting member 7'.

As the drying gas, the waste gases from a gas turbine or a boiler are used. The drying gas outlet tube 84 is in communication with the waste gas inlet tube 2, so that the waste gases having been used for drying may be introduced into the chambers in the adsorption region for desulfurization.

As shown in FIG. 7, each aperture 35 perforated in the partition walls 31 and 32 has an upwardly flaring baffle plate 90 connected to the lower edge thereof, so as to prevent the water from flowing outwardly from the adsorbent bed zone 33 through said aperture. The opening between the top edge of each baffle plate 90 and the exterior walls of the partition walls 31 and 32 is covered by a screen 91, as shown in FIG. 7b, to prevent the active carbon particles from going outwardly from said absorbent bed zone 33. Alternatively, the screen 91 may be applied so as to directly cover each aperture 35 in the manner shown in FIG. 7a.

The water feed tubes 81 each have a solenoid valve 92 mounted therein, and similarly the drain tubes 82 each have a solenoid valve 93 mounted therein, said soleonid valves 92 and 93 being electrically connected with an electric wire 94 for cooperation.

In operating the apparatus in this embodiment, the gas passage shifting members 6' and 7' are revolved intermittently through an angle of 60° at each time. After the passage of a prescribed period, the shifting members are revolved in a clockwise direction as viewed in FIG. 6, whereby the chamber 76 is shifted to constitute the adsorption region, the chamber 73 to constitute the water-washing and desorption region, and the chamber 74 to constitute the drying region. As such, each chamber constitutes the adsorption region, water-washing and desorption region and drying region one after another in sequence. The apparatus in this embodiment is economically advantageous over that in the preceding embodiment due to the fact that water is used for desorption in lieu of the carbon dioxide gas or nitrogen gas in the preceding embodiment and further the waste gases are used for drying the wet active carbon.

What is claimed is:

1. An apparatus for the removal of sulfur oxides from waste gases by use of an adsorbent which comprises a container means, partition means dividing the interior of the container means into a plurality of chambers, each of said chambers being divided into a plurality of portions with an intermediate portion housing an adsorbent bed, those portions adjacent said intermediate portions being provided with barrier plates which cause the gases to flow in a zig-zag manner through said intermediate portion, the walls defining said intermediate portion being provided with a substantial number of apertures therein, some of said plurality of chambers being disposed in an adsorption region, some in a desorption region and some in idle regions which separate said adsorption and desorption regions, inlet means for introducing a waste gas to the adsorption region, outlet means for removing the purified gas from the adsorption region, inlet means for introducing a desorbing gas into the desorbing region, outlet means for removing the desorbing gas from the desorbing region, means to prevent contact with any of said gases in said idle region and means for progressively and sequentially changing the passage of said gases in said chambers from one region to another region.

2. The apparatus of claim 1, wherein the gas passage means is a gas passage shifting member rotatably mounted on each the top and the bottom of the container means, each of said shifting members containing apertures for the introduction and removal of gases to and from the adsorption and desorption regions.

3. The apparatus of claim 2, wherein the apertures in each of the gas passage shifting members are circumferentially and radially spaced slots, each of said slots in one of said shifting members being axially aligned with a corresponding slot in the other of said shifting members, said slots thereby cooperating together to allow the gases to flow into the container means, separately through inlet means, adsorption beds and outlet means in the adsorption region and inlet means, adsorption beds and outlet means in the desorption region.

4. The apparatus of claim 3, wherein the walls of the intermediate chamber are coated with a corrosion resistant material.

5. The apparatus of claim 1, wherein the walls of the upper portions of the intermediate chambers do not contain apertures.

6. An apparatus for the removal of sulfur oxides from waste gases by use of an adsorbent which comprises a container means, partition means dividing the interior of the container means into a plurality of chambers, each of said chambers being divided into a plurality of portions with an intermediate portion housing an adsorbent bed, the walls defining said intermediate portion being provided with a substantial number of apertures therein, each of said apertures being provided with an upwardly flaring baffle plate connected to the lower edge of each of said apertures to prevent water from flowing outwardly from the absorbent bed through said apertures, some of said plurality of chambers being disposed in an adsorption region, some in a desorption region and some in a drying region, means for introducing a waste gas into said adsorption region, means for discharging the purified gas from said adsorption region, means for introducing water into said desorption region, means for discharging the water from said desorption region, means for introducing drying gas into said drying region, means for discharging the drying gas from said drying region and means for progressively and sequentially changing the passage of said gases in said chambers from one region to another region.

7. The apparatus of claim 6, wherein a screen means covers each aperture by extending from the top edge of each baffle plate to the exterior walls of the intermediate chamber.

8. The apparatus of claim 6, wherein a screen means directly covers each aperture.

9. The apparatus of claim 6, wherein the means for introducing and discharging the wash water are provided with separate valve means which are synchronized for cooperation of operation.

10. The apparatus of claim 6, wherein means are provided for introducing the used drying gas into the chambers in the adsorption region of the apparatus.

References Cited

UNITED STATES PATENTS

| 2,347,829 | 5/1944 | Karlsson et al. | 55—179 X |
| 2,751,034 | 6/1956 | Ringo et al. | 55—180 |
| 3,284,158 | 11/1966 | Johswich | 23—178 |
| 1,590,266 | 6/1926 | Tiedtke et al. | 55—182 |

FOREIGN PATENTS

| 871,242 | 6/1961 | Great Britain. |
| 508,372 | 6/1939 | Great Britain. |

REUBEN FRIEDMAN, Primary Examiner

R. W. BURKS, Assistant Examiner